United States Patent [19]

Poston

[11] Patent Number: 5,693,588
[45] Date of Patent: Dec. 2, 1997

[54] REDUCTION OF SPALLING IN MIXED METAL OXIDE DESULFURIZATION SORBENTS BY ADDITION OF A LARGE PROMOTER METAL OXIDE

[75] Inventor: James A. Poston, Star City, W. Va.

[73] Assignee: The United States of America as represented by the Department of Energy, Washington, D.C.

[21] Appl. No.: 689,634

[22] Filed: Aug. 16, 1996

[51] Int. Cl.⁶ .............................. B01J 20/00; B01J 20/02; B01J 23/00; B01J 20/18
[52] U.S. Cl. .................. 502/400; 502/400; 502/405; 502/407; 502/302; 423/573.1
[58] Field of Search ....................... 502/400, 405, 502/407, 411, 428, 517, 406, 302; 423/573.01, 244.1

[56] References Cited

U.S. PATENT DOCUMENTS

| | | | |
|---|---|---|---|
| 4,001,375 | 1/1977 | Longo | 423/244 |
| 5,326,737 | 7/1994 | Kay et al. | 502/400 |
| 5,494,880 | 2/1996 | Siriwardane | 502/400 |

*Primary Examiner*—Glenn Caldarola
*Assistant Examiner*—Tanaga Anne Boozer
*Attorney, Agent, or Firm*—Lisa A. Jarr; Stephen D. Hamel; William R. Moser

[57] ABSTRACT

Mixed metal oxide pellets for removing hydrogen sulfide from fuel gas mixtures derived from coal are stabilized for operation over repeated cycles of desulfurization and regeneration reactions by addition of a large promoter metal oxide such as lanthanum trioxide. The pellets, which may be principally made up of a mixed metal oxide such as zinc titanate, exhibit physical stability and lack of spalling or decrepitation over repeated cycles without loss of reactivity. The lanthanum oxide is mixed with pellet-forming components in an amount of 1 to 10 weight percent.

10 Claims, No Drawings

REDUCTION OF SPALLING IN MIXED METAL OXIDE DESULFURIZATION SORBENTS BY ADDITION OF A LARGE PROMOTER METAL OXIDE

ORIGIN OF THE INVENTION

The United States Government has rights in the invention pursuant to the employer-employee relationship of the United States Department of Energy and the inventor.

FIELD OF THE INVENTION

This invention relates to removal of sulfur from coal-derived reducing gas mixtures and to regeneration of reacted mixed metal oxide desulfurization sorbents.

BACKGROUND OF THE INVENTION

Coal represents our largest available source of fossil energy. The efficiency of converting this stored chemical energy to electrical energy can be improved significantly if the coal is first gasified and the resulting hot fuel gas is oxidized in a turbine or fuel cell. One of the most promising systems in which fuel gas from coal is used to produce electrical energy is the integrated Gasification Combined Cycle (IGCG) power system. The principal advantage of this type of system is that it can provide an economical process operating with improved thermal efficiency. Environmental problems are presented, however, in that sulfur, which is present in most coals, is converted to sulfur-containing gases, principally hydrogen sulfide, in the gasification step. During combustion of the fuel gas, the hydrogen sulfide would be converted to sulfur dioxide, and, unless separated from effluent gas, it pollutes the atmosphere and contributes to acid rain. Sulfur-containing gases also cause damage to turbines and related equipment by corrosion. Removal of sulfur values from coal gas is therefore an important goal.

Separation of sulfur compounds from coal gas mixtures has been carried out by contacting the mixture with a bed of sorbent material, such as zinc oxide or zinc titanate, at a high temperature, whereby the sulfur is converted to solid sulfate or sulfide and regenerating the bed for reuse by contacting it with an oxidizing stream or steam.

While effective reactions between sulfur compounds and metal oxide sorbents have been realized in fixed and moving bed processes, sorbent pellets required in such processes have failed to show sufficient durability for economical operation. Sustained operation over a series of at least 100 cycles of sulfidation and regeneration without replacing the pellets would be desirable. In the course of undergoing sulfidation and regeneration, the sorbent pellets consistently undergo spalling or breaking apart, creating fines that interfere with the process. In addition to producing a pressure drop across the sorbent bed, this results in mechanical failure of components by contamination with the fines and may necessitate an expensive additional cleaning step that would result in a loss in reactor efficiency. Based on the results of numerous tests and studies, spalling has been attributed, at least in part, to contraction and expansion of sorbent pellet lattices occurring during sulfidation and regeneration. In any event, imparting into sorbent pellets a resistance to spalling without degrading their reactivity to hydrogen sulfide is needed.

SUMMARY OF THE INVENTION

In the present invention, mixed oxide sorbent pellets for removing sulfur compounds from a coal-derived gas mixture at high temperature are modified by inclusion in the pellets of an effective stabilizing amount of a large promoter metal oxide. The term "large promoter metal oxide" as used herein is intended to refer to an oxide of a metal which has an ionic radius substantially larger than the ionic radii of the mixed metal oxide components of the sorbent pellet and/or extrudate, and which can either be reactive or non-reactive with the gaseous sulfur compounds, and are compatible with the mixed oxide sorbent such that its presence and/or interaction with the mixed metal oxide sorbent imparts durability without loss of reaction efficiency. Oxides which may be used as the large promoter metal oxide component include lanthanum trioxide, cerium oxide, zirconium oxide, and hafnium oxide.

The mixed metal oxides of the pellets, which undergo spalling during repeated cycles of sulfidation and regeneration in the absence of a large promoter metal oxide, may comprise zinc ferrite, zinc titanate, copper aluminate, copper-iron oxide, iron aluminides, and the like. Zinc titanate is emphasized herein because it is widely known and one of the most widely tested sorbents, thus providing an abundance of comparative information and data.

Although this invention is not to be understood as limited to a particular theory, it is believed that spalling, at least in part, occurs due to the contraction and expansion of the sorbent pellet lattice during sulfidation and regeneration and is related to sulfate formation and disassociation along grain boundaries. As exemplified by the zinc titanate-lanthanum trioxide system, the effectiveness of lanthanum trioxide in preventing spalling of the pellets is considered to be based on the substantially larger ionic radius of lanthanum ($La^{+3}$) as compared to either of the metal oxide components in the mixed oxides of the pellets, 35% greater than $Ti^{+4}$ and 30% greater than $Zn^{+2}$. Presence of the material with a larger ionic radius helps to reduce or eliminate expansion and contraction of the sorbent pellet lattice.

It is therefore an object of this invention to provide mixed metal oxide sorbent pellets that are resistant to spalling upon undergoing repeated cycles of sulfur absorption and regeneration.

Another object is to provide a means for imparting durability to such pellets without loss of reactivity in sulfidation reactions.

Other objects and advantages of the invention will be apparent from the following detailed description and the appended claims.

DESCRIPTION OF THE PREFERRED EMBODIMENT

Sorbents embodying the invention are generally useful for desulfurization of fuel gas mixtures obtained by gasification of coal. Such gas mixtures typically contain 5% to 20% steam, 20% to 30% carbon monoxide, 5% to 10% carbon dioxide, 10% to 30% hydrogen, 45% to 55% nitrogen, and 0.05% to 0.2% hydrogen sulfide, depending on the specific composition of the coal being processed and the type of gasification reactor. Off-gas mixtures from coal gasification processes typically emerge from the reactor at a temperature of 982° C. to 1,315° C. at a pressure of 15 to 600 psig. It is preferred to employ a temperature of 438° C. to 760° C. and a pressure of 15 to 400 psig in the desulfurization process. Desulfurization reactions using sorbent pellets embodying the invention may be carried out in conventional fixed-bed reactors or moving-bed reactors, with pellet size selected depending upon the type of reactor. Pellets of a selected size may be prepared by controlling conditions used in pellet formation. Smaller pellet sizes may be used to obtain better diffusion of the gas being treated.

In the case of lanthanum-doped zinc titanate pellets, the pellets may be prepared by mixing finely divided precursor oxide powders, that is, zinc oxide and titanium oxide, at the mole ratio required for titanate formation, that is, 2:1, respectively, along with an effective amount of lanthanum trioxide ($La_2O_3$) and a binder, pelletizing the mixture, and then drying and calcining the pellets at an elevated temperature. The starting zinc oxide and titanium oxide as well as lanthanum oxide are preferably provided at a very small particle size such as 1 to 5 microns in order to obtain effective mixing and pellet formation. Similar procedures may be used for other mixed oxides or other large reactive metal oxide additives. In general, the large reactive metal oxide may be provided in an amount of 1 to 10 weight percent, and 5 percent has been found effective in proof-of-concept tests.

Although a ratio of precursor oxides of 2:1 is generally used for zinc titanate preparation, other ratios such as 1.8:1 and 1.6:1 have also been used and found effective.

A binder is included in the pellets to bind the metal oxides together and to provide pellet integrity. Bentonite at an amount of 3 to 5 weight percent may be used for this purpose. Other conventional binders may also be used. Mixing and pelletizing may be carried out using conventional equipment such as an Eirich mixer/pelletizer. The pelletizing process is controlled to obtain desired pellet size such as 4 to 5 mm spherical pellets for use in fixed bed reactors. Pellets may also be prepared in cylindrical shape by extrusion. The pellets are then placed in a marumizer in order to make the pellets spherical if desired. Drying may be carried out by placement in a vacuum at a temperature such as 200° C. for a period of at least 6 hours. The dried pellets are then calcined at a temperature of at least 540° C. for a minimum period of 8 hours. Lower temperatures will result in substantially incomplete conversion of the oxide to the desired form. Some small amount of the pellets may remain unconverted without loss of reactivity. The highest calcination temperature should approach or be equivalent to the desulfurization reaction temperature, but not exceed the maximum temperature durability of the sorbent.

Other metal oxide stabilizers in which the metal component of the stabilizer has a substantially larger ionic radius than the reactive metals of the sorbent pellets and which are compatible with and do not degrade the physical characteristics nor the reactivity of the mixed metal oxide sorbent may also be used in carrying out the invention. Such other oxide stabilizers include oxides of cerium, zirconium, and hafnium.

The invention is further illustrated by the following example.

EXAMPLE

Proof of Concept Experiments

Lanthanum-containing zinc titanate sorbent pellets were prepared by the following procedure:

Zinc oxide and titanium oxide both in finely divided form with a particle size of 5 microns were combined with one another at a 2:1 molar ratio and with 5 weight percent lanthanum oxide ($LA_2O_3$) and 3.5 weight percent bentonite binder. These materials were mixed and pelletized in an Eirich mixer/pelletizer and placed in a Fuji Paudol Company marumeizer, and the pellets were rounded off. The resulting spherical pellets had a diameter of 4 to 5 millimeters. The pellets were they dried overnight in a vacuum oven at 200° C. and calcined at 550° C. for 15 hours.

The calcined pellets were then loaded into a 1-inch diameter bed in a high temperature-low pressure fixed bed reactor for a series of sulfidation and regeneration cycles. For each sulfidation reaction, the bed was contacted with simulated coal-derived gas containing 9% steam, 21% carbon monoxide, 7% carbon dioxide, 15% hydrogen, 47.8% nitrogen, and 200 ppm hydrogen sulfide at a temperature of 538° C. and a pressure of 0.26 MPa. Breakthrough is defined as the time when detection of outlet gas showed a value of 200 ppm. $H_2S$ was determined in each case by monitoring of effluent gas.

Following completion of sulfidation, the pellet bed was contacted with a regenerating gas mixture containing 50% steam, 49% nitrogen, and 1% oxygen in three stages, each at a pressure of 0.46 MPa and a temperature increasing from 538° C. in the first stage to 593° C. in the second stage and 649° C. in the third. Five cycles of desulfurization and regeneration under these conditions were carried out.

Breakthrough times determined for the sorbent pellets demonstrated a good reactivity with the hydrogen sulfide throughout the series of cycles, with a leak through rate of less than 50 ppm for a minimum of 5 hours on-line during all sulfidations. This result is similar to values obtained previously for zinc titanate sorbents. Thus, the presence of lanthanum oxide produced no negative effect on performance. After the five-cycle test, the sorbent pellets were closely examined by visual observation, optical observation, and secondary electron imaging to determine whether spalling or decrepatation had occurred. Visual inspection of the reaction revealed no significant amount of sorbent fines in the reactor system as would be produced by spalling. Observation of sample morphology using secondary electron images indicated some additional conglomeration of particles and grains within the reacted pellets as compared to unreacted samples, but no fines or apparent large differences between the morphology of fresh, sulfided, and regenerated samples were observed. This is in contrast with results obtained previously for other forms of zinc titanate and zinc ferrite where spalling had been observed after only one cycle, except where sulfur loading was below 3%. Using the present sorbents, 4% to 6% sulfur loading was obtained without spalling.

The above example is merely illustrative and is not to be construed as limiting the scope of the invention, which is limited only as indicated by the appended claims.

I claim:

1. Absorbent pellets for removing gaseous sulfur compounds from a reducing gas mixture by contacting the mixture with a bed of said pellets at an elevated temperature comprising a mixed metal oxide desulfurization sorbent having incorporated therein an effective stabilizing amount of a promoter metal oxide having a larger ionic radius of the metal component thereof than the ionic radii of metals of said mixed metal sorbent selected from the group consisting of lanthanum trioxide, cerium oxide, zirconium oxide, and hafnium oxide and a binder.

2. Absorbent pellets as defined in claim 1 wherein said large promoter metal oxide is provided in said pellets in an amount of 1 to 10 weight percent.

3. Absorbent pellets as defined in claim 2 wherein said mixed metal desulfurization sorbent comprises zinc titanate.

4. Absorbent pellets as defined in claim 3 wherein said large promoter metal oxide comprises lanthanum trioxide.

5. Absorbent pellets for removing hydrogen sulfide from a reducing coal-gas mixture comprising a pelletized reaction product of a finely divided mixed metal oxide, or ferrite selected from the group consisting of zinc titanate, zinc ferrite, copper aluminate, copper-iron oxide, and iron aluminides, a stabilizing amount of a promoter metal oxide selected from the group consisting of lanthanum trioxide, cerium oxide, zirconium oxide, and hafnium oxide and a binder, said reaction product being calcined at an elevated temperature whereby said mixed oxide or ferrite is converted to absorbent form.

6. Absorbent pellets as defined in claim 5 wherein said large promoter metal oxide is provided in an amount of 1% to 10%.

7. Absorbent pellets as defined in claim 4 wherein said pellets are adapted for use in a fixed bed reactor or a moving bed reactor.

8. Absorbent pellets as defined in claim 4 wherein said pellets are generally spherical and having a diameter of 4 to 5 millimeters.

9. Absorbent pellets as defined in claim 6 wherein said promoter metal oxide comprises lanthanum trioxide.

10. Absorbent pellets as defined in claim 9, wherein said mixed metal oxide comprises zinc titanate.

* * * * *